United States Patent [19]

Honda

[11] Patent Number: 4,752,083
[45] Date of Patent: Jun. 21, 1988

[54] COVER FOR AN AIR BAG UNIT

[75] Inventor: Kiyoshi Honda, Saitama, Japan

[73] Assignee: Honda Giken Kogyo Kabushiki Kaisha, Tokyo, Japan

[21] Appl. No.: 20,487

[22] Filed: Mar. 2, 1987

[30] Foreign Application Priority Data

Feb. 28, 1986 [JP] Japan .................................. 61-44770

[51] Int. Cl.$^4$ ........................................... B60R 21/16
[52] U.S. Cl. .................................................... 280/731
[58] Field of Search ......................... 280/728, 731, 732

[56] References Cited

U.S. PATENT DOCUMENTS 4,148,503 4/1979 Shiratori et al. ..................... 280/731
4,334,699 6/1982 Patzelt et al. ....................... 280/731

FOREIGN PATENT DOCUMENTS 3116538 11/1982 Fed. Rep. of Germany ...... 280/732
55-110643 8/1980 Japan .

Primary Examiner—Kenneth R. Rice
Attorney, Agent, or Firm—Lyon & Lyon

[57] ABSTRACT

In an air bag unit for use in a motor vehicle, including a casing mounted onto a steering wheel assembly, a gas generator arranged in the casing, an inflatable air bag fixed to the casing and communicating with the gas generator and a cover adapted to cover the casing, the cover comprises a base portion fixedly mounted to the casing and a top portion connected to the base portion and having first and second weakened portions, the first and second weakened portions being broken upon inflation of the air bag, so that the top portion is divided into two cover pieces and that these cover pieces are open outwardly, a reinforcing member embedded in the cover except the first and second weakened portions, and one or a plurality of hooks arranged in the base portion, each hook being engaged with the reinforcing member and being fixed to the casing of the air bag unit. Each hook includes a base plate and a bent portion. The base plate is fixed to the casing, and the bent portion has a plurality of hook elements with which the reinforcing member is engaged.

5 Claims, 4 Drawing Sheets

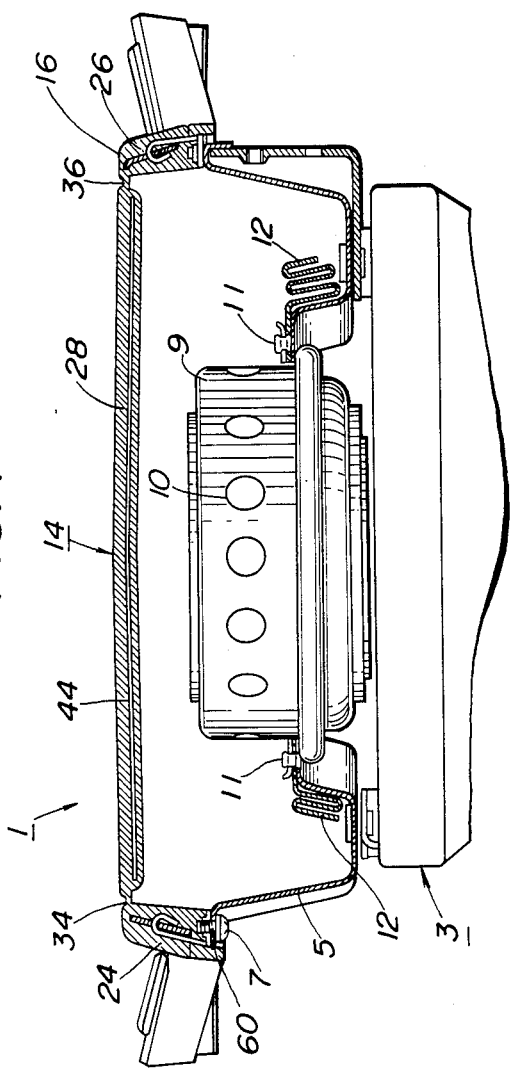
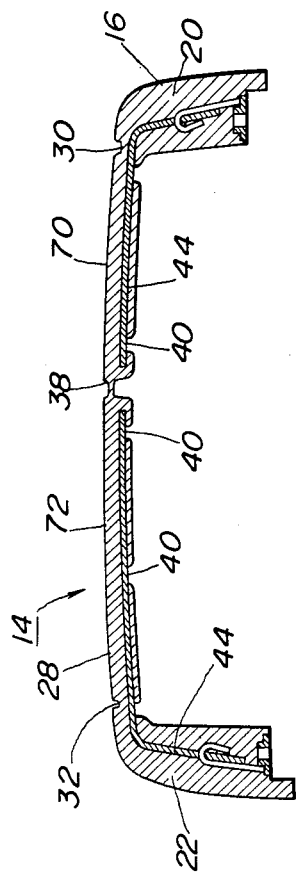
FIG.1
FIG.3

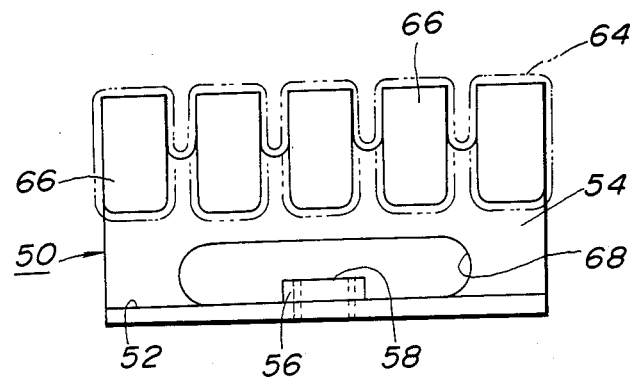
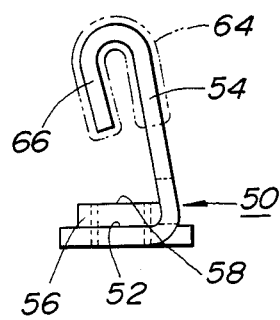
FIG.5　　　FIG.6
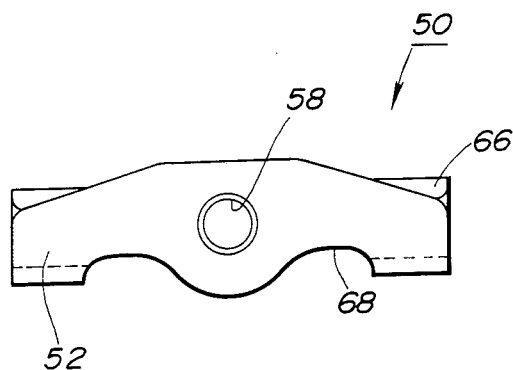
FIG.7

COVER FOR AN AIR BAG UNIT

BACKGROUND OF THE INVENTION

1. Field of the Invention

The present invention relates generally to an air bag unit for use in a motor vehicle and more particularly to a cover for such air bag unit.

2. Description of the Related Art

Japanese patent laid open No. 55/110643 discloses an air bag unit which includes a casing fixedly mounted in a steering wheel assembly, a gas generator arranged in the casing, an air bag communicating with the gas generator, and a cover adapted to cover the casing. The air bag is normally in a folded condition and is inflatable when gas under high pressure is fed from the gas generator upon the occurrence of an accident. The cover has a body and a top portion connected to the body via connecting and weakened portions formed therein. Upon the inflation of the air bag, the weakened portions are broken. Consequently, the top portion of the cover is divided into two separate pieces, which are open toward the driver of the vehicle. A reinforcing member is embedded in the cover to prevent separation of the two cover pieces from the body of the cover.

In such conventional air bag unit, the body of the cover must be rigid and thick to prevent separation of the body of the cover from the casing or the steering wheel assembly. However, this results in an increase in cost and weight of the entire air bag unit and also, prevents a compact arrangement of the air bag unit.

SUMMARY OF THE INVENTION

Therefore, it is an object of the present invention to provide a cover for an air bag unit, which prevents separation of cover pieces from the base portion of the cover, as well as separation of the cover from a casing or a steering wheel assembly.

It is another object of the invention to provide a cover for an air bag unit, which enables compact arrangement of the air bag unit According to a preferred embodiment of the invention, in an air bag unit for use in a motor vehicle, including a casing mounted onto a steering wheel assembly, a gas generator arranged in the casing, an inflatable air bag fixed to the casing and communicating with the gas generator and a cover adapted to cover the casing, the cover comprises a base portion fixedly mounted to the casing and a top portion connected with the base portion and having at least one weakened portion, the weakened portion being broken upon inflation of said air bag, so that at least part of the top portion is open outwardly from the base portion, a reinforcing member embedded in the cover except the weakened portion, and one or a plurality of hooks attached to the base portion, each hook being engaged with the reinforcing member and being fixed to the casing of the air bag unit.

The reinforcing member is made of synthetic resin and is in the form of a net. Each of the hooks includes a base plate and a bent portion. The base plate is fixed to the casing and the bent portion has a plurality of hook elements with which the reinforcing member is engaged. Preferably, the hook elements are coated with nylon.

The above and further objects, features, and advantages of the present invention will become more apparent from the following description when taken in conjunction with the accompanying drawings.

BRIEF DESCRIPTION OF THE DRAWINGS

FIG. 1 is a sectional view of an air bag unit including a cover according to one embodiment of the present invention;

FIG. 3 is a sectional view taken along the line III—III of FIG. 2;

FIG. 5 is a front view of a hook embedded in the cover shown in FIG. 1;

FIG. 6 is a side view of the hook shown in FIG. 5;

FIG. 7 is a bottom view of the hook;

DESCRIPTION OF THE PREFERRED EMBODIMENTS

Figure 2:
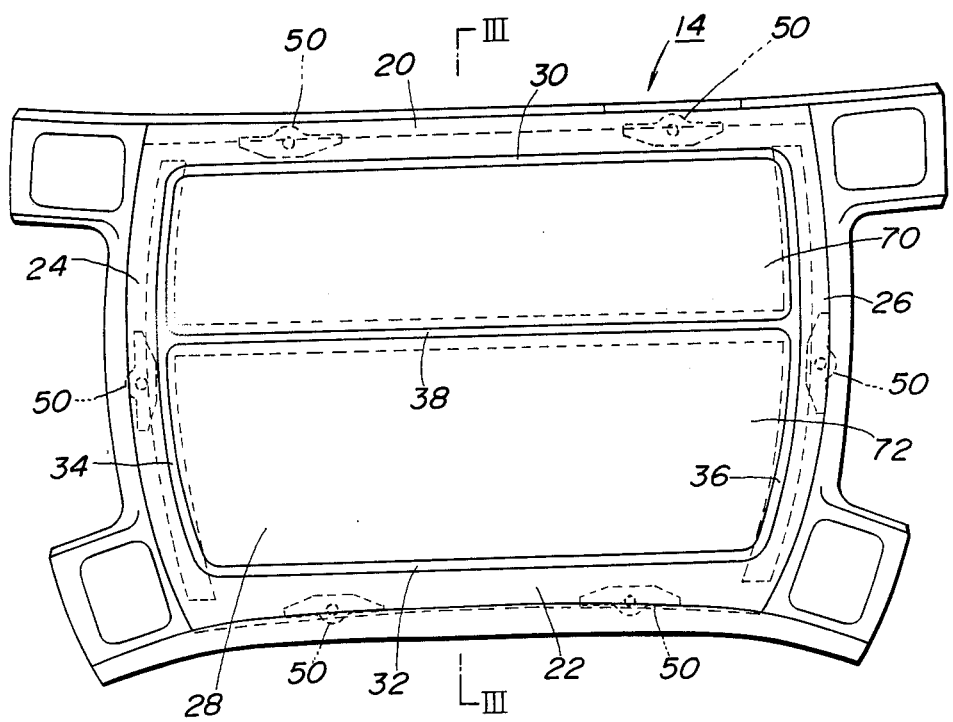
FIG. 2 is a top plan view of the cover shown in FIG. 1.

With reference to FIG. 1, there is illustrated an air bag unit, generally indicated at 1, includes a casing 5 fixedly mounted on the top of a steering wheel assembly 3 and having a flange 7 at its top end, a gas generator 9 integrally formed centrally in the casing 5 and having a plurality of openings 10 at its outer periphery, an inflatable air bag 12 riveted as at 11 to the casing 5 and communicating with the gas generator 9 through the openings 10, and a cover 14 adapted to cover the casing 5. Within the casing 5, the air bag 12 is normally in a folded condition.

Figure 4:
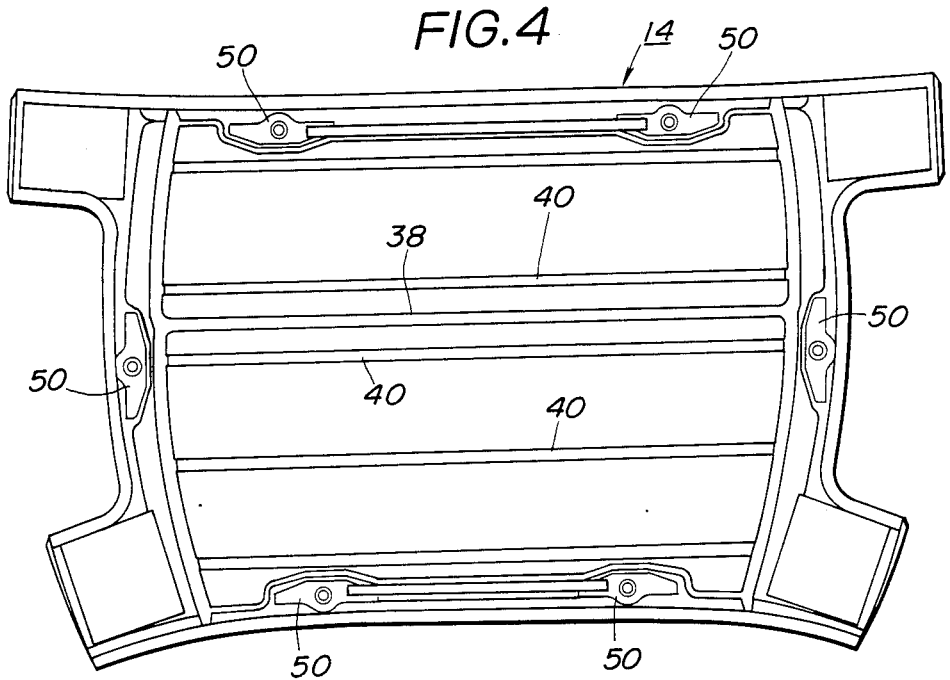
FIG. 4 is a bottom view of the cover shown in FIG. 1.

With reference to FIGS. 1 to 3, the cover 14 is preferably made of synthetic resin. The cover 14 includes a base portion 16 of a sufficient thickness having a front side 20, a rear side 22, a left side 24, and a right side 26, and a top portion 28 having a thickness less than that of the base portion 16. The top portion 28 has two concaved or connecting portions 30, 32 extending substantially along the front and rear sides 20, 22 of the base portion 16 respectively, first thin or weakened portions 34, 36 extending substantially along the left and right sides 24 and 26 of the base portion 16 respectively and connected to the two concaved portions 30, 32, and a second thin portion 38 extending substantially parallel to the concaved portion 30, 32 and connected to the first thin portions 34, 36. As shown in FIGS. 3 and 4, a plurality of slots 40 are formed in the lower surface of the top portion 28 and extend substantially parallel to the second thin portion 38. The slots 40 are intended to avoid concentration of force to be applied to the concaved portions 30, 32 when the air bag 12 is inflated to open the top portion 28 of the cover 14.

With continuing reference to FIGS. 1 to 3, a reinforcing element 44 is embedded in the cover 14, except the first and second thin portions 34, 36 and 38 as shown in a broken line in FIG. 2. In a preferred embodiment, the reinforcing element 44 is fabricated from polyester fibers and is in the form of a net.

According to the invention, a plurality of metal hooks 50 are partly or entirely embedded in the base portion 16 of the cover 14 as shown in FIGS. 1 to 4. As shown in FIGS. 5 to 7, each hook 50 includes a base plate 52 bolted to the flange 7 of the casing 5 (FIG. 1) and a bent portion 54. A boss 56 is formed on the base plate 52 and has a through hole 58 into which a bolt 60 (FIG. 1) is inserted to fix the cover 14 onto the flange 7 of the casing 5. The bent portion 54 is preferably coated with nylon 64, and has a plurality of hook elements 66 with which the reinforcing element 44 is engaged. A relatively large opening 68 is formed at the lower portion of the bent portion 54 to reduce the weight of the hook 50.

When a conventional sensor (not shown) senses impact received by the vehicle, the gas generator 9 is thereby actuated to feed gas under high pressure to the interior of the air bag 12 through the openings 10. Following inflation of the air bag 12, substantial force is applied to the lower surface of the top member 28 of the cover. As a result, the first and second thin portions 34, 36 and 38 are broken, and the top portion 28 of the cover 14 is divided into two pieces, namely, first and second cover pieces 70. At the same time, the first and second cover pieces 70 and 72 are bent outwardly from the concaved portions 30, 32 and is open toward the driver of the vehicle. This causes the air bag 12 to be fully inflated before the driver to avoid or minimize damages to the driver during an accident.

As best seen in FIG. 3, the concaved portions 30, 32 are greater in thickness than the first and second thin portions 34, 36 and 38. In addition, the reinforcing element 44 is embedded in the concaved portions 30, 32. Accordingly, the first and second cover pieces 70, 72 are neither broken nor separated from the concaved portions 30, 32 when they are forcibly opened. According to the invention, the edge of the reinforcing element 44 is in engagement with the hook elements 66 of the hooks 50 which is, in turn, fixed onto the flange 7 of the casing 5. This arrangement will serve to prevent separation of the base portion 16 of the cover 14 from the casing 5 and the steering wheel assembly 3 when the air bag is inflated to open the top portion of the cover.

Figure 8:
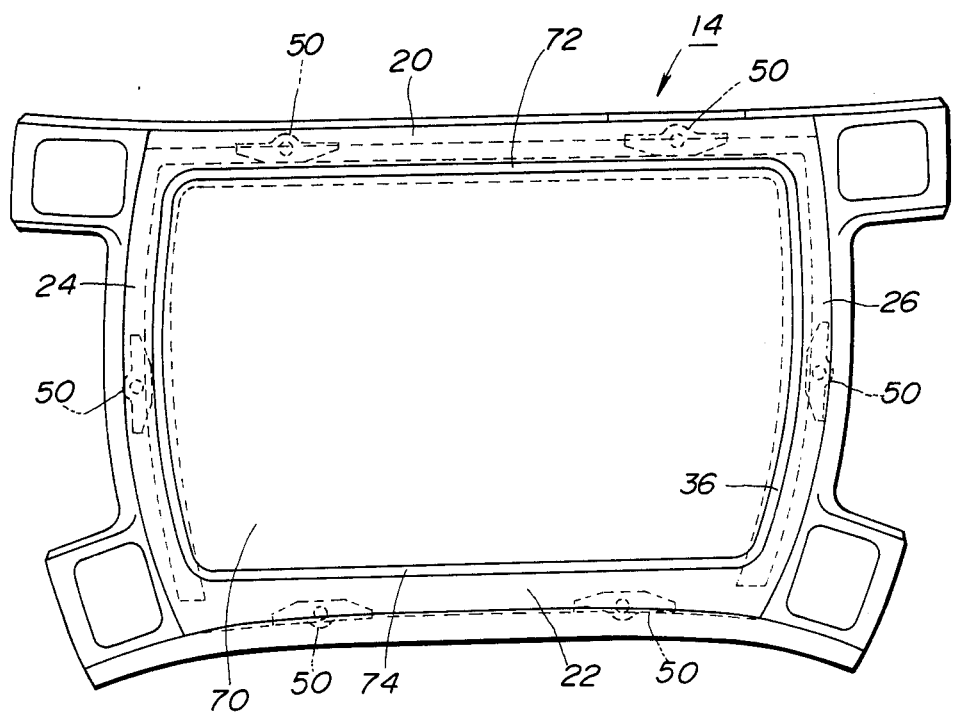
FIG. 8 is a top plan view of a cover according to another embodiment of the invention.

FIG. 8 illustrates another embodiment of the invention wherein like reference numerals designate like structural elements. In the illustrated embodiment, the cover 14 includes the base portion 16 having the front, rear, left and right sides 20, 22, 24, and 26, and a top portion 70. The top portion 70 of the cover 16 has a thin or weakened portion 72 extending along the front side 20, left side 24, and right side 26 and a concaved portion 74 extending substantially parallel to the rear side 22 of the base portion 16 and connected with the thin portion 72. The reinforcing element in the form of a net is embedded in the cover 16, except the thin portion 72 of the top portion 70. Other structures are substantially identical to the foregoing embodiment and are, therefore, not explained. With this arrangement, when the air bag 12 is inflated, only the thin portion 72 is broken and as a result, the top portion 70 is bent outwardly from the concaved portion 74 and are open toward the driver of the vehicle.

It is to be understood that various changes and modifications are made in the invention without departing from the scope of the invention as defined by the appended claims.

What is claimed is:

1. A cover for an air bag unit for use in a motor vehicle, said air bag unit including a casing mounted on a steering wheel assembly, a gas generator arranged at said casing and an inflatable air bag fixed to said casing and adapted to communicate with said gas generator, said cover comprising:
   a base portion fixedly mounted to said casing;
   a top portion connected with said base portion and having at least one weakened portion, said weakened portion being broken upon inflation of said air bag by operation of said gas generator, so that at least part of the top portion is opened outwardly from said base portion;
   a reinforcing member embedded in said base and top portions except said weakened portion; and
   one or a plurality of hooks embedded in said base portion and engaged with said reinforcing member, each of said hooks being secured to said casing of the air bag unit.

2. A cover for an air bag unit according to claim 1, wherein said weakened portion is much less in thickness than the remaining of said top portion of the cover.

3. A cover for an air bag unit according to claim 1, wherein said reinforcing member is made of synthetic resin and is in the form of a net.

4. A cover for an air bag unit according to claim 1, wherein each of said hooks includes a base plate and a bent portion, said base plate being fixed to said casing and said bent portion having a plurality of hook elements with which said reinforcing member is engaged.

5. A cover for an air bag unit according to claim 4, wherein said hook elements of each hook are coated with nylon.

* * * * *